(12) United States Patent
Fehr et al.

(10) Patent No.: US 11,059,715 B2
(45) Date of Patent: Jul. 13, 2021

(54) RFID APPARATUSES AND ASSOCIATED COMMUNICATION METHODS

(71) Applicant: Infineon Technologies AG, Neubiberg (DE)

(72) Inventors: Bernhard Fehr, Glonn (DE); Benjamin Schwabe, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/453,073

(22) Filed: Jun. 26, 2019

(65) Prior Publication Data

US 2020/0062579 A1    Feb. 27, 2020

(30) Foreign Application Priority Data

Aug. 23, 2018  (DE) .......................... 102018120595.3

(51) Int. Cl.

| | | |
|---|---|---|
| *B60K 15/04* | (2006.01) | |
| *B60S 5/02* | (2006.01) | |
| *B67D 7/34* | (2010.01) | |
| *G06K 19/073* | (2006.01) | |
| *G07F 15/00* | (2006.01) | |
| *B60K 15/03* | (2006.01) | |

(52) U.S. Cl.
CPC .............. *B67D 7/348* (2013.01); *B60K 15/04* (2013.01); *B60S 5/02* (2013.01); *G06K 19/07327* (2013.01); *G07F 15/001* (2013.01); *B60K 2015/03328* (2013.01)

(58) Field of Classification Search
CPC ........ B67D 7/348; B67D 7/425; B60K 15/04; B60K 2015/03328; B60K 2015/0458; G06K 19/07327; G07F 15/001
See application file for complete search history.

(56) References Cited

U.S. PATENT DOCUMENTS

| | | | |
|---|---|---|---|
| 6,899,151 B1 * | 5/2005 | Latka ..................... | B67D 7/348 |
| | | | 141/392 |
| 2006/0091201 A1 | 5/2006 | Simonson | |
| 2007/0250452 A1* | 10/2007 | Leigh ..................... | B67D 7/348 |
| | | | 705/65 |
| 2010/0308965 A1 | 12/2010 | Weitzhandler et al. | |
| 2011/0035049 A1* | 2/2011 | Barrett ..................... | G07F 7/02 |
| | | | 700/232 |
| 2015/0108223 A1* | 4/2015 | Weitzhandler ... | G06K 19/07749 |
| | | | 235/492 |
| 2016/0012261 A1* | 1/2016 | Kelrich .................. | B67D 7/145 |
| | | | 340/10.51 |
| 2016/0023886 A1* | 1/2016 | Braden .................. | B67D 7/348 |
| | | | 141/94 |
| 2016/0104155 A1* | 4/2016 | Mcgaugh ............. | G06Q 20/401 |
| | | | 705/65 |
| 2018/0238492 A1* | 8/2018 | Johnson .................. | F17C 13/02 |

FOREIGN PATENT DOCUMENTS

| | | |
|---|---|---|
| DE | 69903871 T2 | 9/1999 |
| DE | 102006044780 A1 | 4/2008 |
| GB | 2435036 A | 8/2007 |

\* cited by examiner

*Primary Examiner* — Jason K Niesz
(74) *Attorney, Agent, or Firm* — Harrity & Harrity, LLP

(57) ABSTRACT

An apparatus comprises a passive RFID tag designed to provide information identifying at least one fuel compatible with a vehicle.

21 Claims, 4 Drawing Sheets

RFID APPARATUSES AND ASSOCIATED COMMUNICATION METHODS

CROSS REFERENCE TO RELATED APPLICATIONS

This application claims priority under 35 U.S.C. § 119 to German Patent Application No. 102018120595.3 filed on Aug. 23, 2018, the contents of which is incorporated by reference herein in its entirety.

TECHNICAL FIELD

The present disclosure relates to RFID (radio frequency identification) apparatuses and associated communication methods.

BACKGROUND

Drivers are often filling the tanks of their vehicles with an incorrect fuel by mistake. By way of example, there is the risk of unintentionally filling an automobile having a diesel engine with normal gasoline. Repairing an erroneously filled vehicle can be very costly, in particular if the engine has already been started with the wrong fuel. It therefore makes sense to avoid filling a vehicle with a wrong fuel. Manufacturers of vehicles and vehicle accessories make constant efforts to improve their products and the way in which they work.

SUMMARY

It may, therefore, be desirable to develop apparatuses and methods that allow the problem described above to be overcome.

One aspect of the disclosure relates to an apparatus comprising a passive RFID tag designed to provide information identifying at least one fuel compatible with a vehicle.

A further aspect of the disclosure relates to an apparatus comprising a pump nozzle for dispensing a fuel, and an RFID reader, integrated in the pump nozzle, having a wirelessly rechargeable energy store.

A further aspect of the disclosure relates to a system comprising a passive RFID tag designed to provide information identifying at least one fuel compatible with a vehicle, a pump nozzle for dispensing a fuel and an RFID reader, integrated in the pump nozzle, having a wirelessly rechargeable energy store.

A further aspect of the disclosure relates to a method comprising: providing information using a passive RFID tag, wherein the information identifies at least one fuel compatible with a vehicle, and reading the information using an RFID reader coupled to a gas pump.

BRIEF DESCRIPTION OF THE DRAWINGS

RFID apparatuses and associated communication methods according to the disclosure are explained more specifically below with reference to drawings. Identical reference signs can denote identical components in this case.

DETAILED DESCRIPTION

Figure 1:
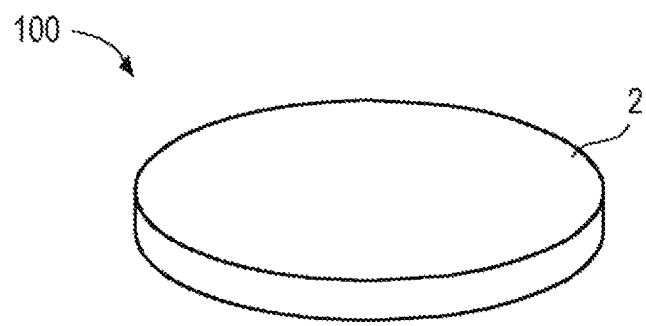
FIG. 1 schematically shows a perspective view of an apparatus 100 having an RFID tag according to the disclosure.

FIG. 1 schematically shows a perspective view of an apparatus 100 according to the disclosure having a passive RFID (radio frequency identification) tag 2. The RFID tag 2 is designed to provide information identifying at least one fuel compatible with a vehicle. The way in which the apparatus 100 works can be based on an RFID technique, in particular on an NFC (near field communication) transmission standard. NFC is based on RFID technology and is distinguished by a specific coupling method, which is standardized in an ISO standard. Besides the coupling method, the frequency range is also stipulated according to an ISO standard. RFID uses electromagnetic fields in order to wirelessly identify and/or track RFID tags, which may be fitted to or contained in apparatuses. In particular, RFID can be used to read information stored in the RFID tag 2. The information of the RFID tag 2 can be read by an RFID reader in this case in particular via a secure communication channel. Before the information is read, the RFID tag 2 can authenticate the RFID reader and vice versa.

The RFID tag 2 can be supplied with energy using electromagnetic induction. It is convenient to provide the electromagnetic induction using time-variant magnetic fields. The magnetic fields can be produced by an appropriately equipped RFID reader.

In the event of a query by an RFID reader, the RFID tag 2 can draw energy using electromagnetic induction and can use this energy to send a response to the RFID reader in the form of radio frequency signals. Such an RFID tag is also referred to as a passive RFID tag 2, since it does not have to contain a power source of its own. Rather, a passive RFID tag 2 can obtain the energy for sending its response using electromagnetic radiation from its surroundings.

The RFID tag 2 can contain an integrated circuit for storing and processing information. Additionally, the integrated circuit may be designed to modulate and demodulate a radio frequency signal. The integrated circuit can collect power from a radio frequency signal sent by an RFID reader. The RFID tag 2 can further contain a suitable number of antennas designed to receive and send radio frequency signals in interference-proof fashion. Beyond this, the RFID tag 2 can contain a memory for storing data. The RFID tag 2 may be designed to operate in a frequency range of from approximately 30 kHz to approximately 300 kHz, more precisely in a frequency range of from approximately 120 kHz to approximately 150 kHz, e.g. to receive and/or send radio frequency signals in this frequency range. For this frequency range, the RFID tag 2 can be detected by an RFID reader, and information stored in the RFID tag 2 can be read by an RFID reader, at a range of up to approximately 10 cm.

Information stored in the RFID tag 2 can identify a fuel compatible with a vehicle. The vehicle can be in particular a motor vehicle, such as e.g. an automobile. The fuel can be in particular gasoline or diesel. In a simple nonlimiting example, the stored information can include a single bit, wherein a bit value of zero identifies gasoline as the compatible fuel and a bit value of one identifies diesel as a compatible fuel, and vice versa. The RFID tag 2 may be arranged at a fuel tank opening of the vehicle, for example. As a result, an RFID reader integrated in a pump nozzle can read the information stored in the RFID tag 2.

For this purpose, a distance between the RFID tag 2 and the fuel tank opening can be shorter than a range of an NFC communication. As described later on, knowledge of the compatible fuel makes it possible to prevent the vehicle from being filled with a wrong fuel from a gas pump.

Besides the information for identifying a fuel compatible with a vehicle, the RFID tag 2 can provide further information. By way of example, the RFID tag 2 can provide information using which the identity of the vehicle is explicitly ascertainable. In one example, such information can correspond to or contain the vehicle identification number of the vehicle. The vehicle identification number is an internationally standardized, 17-digit serial number using which a motor vehicle is explicitly identifiable. Examples relating to the use of such information are described later on. In addition, it would naturally also be possible to use other signatures for explicitly identifying the motor vehicle, e.g. the license plate.

Figure 2:
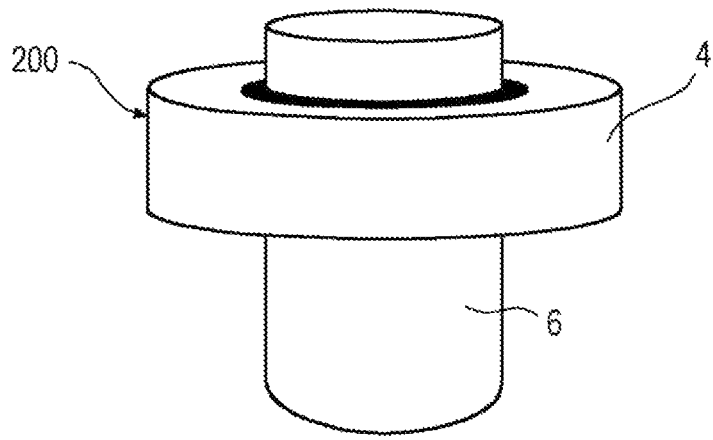
FIG. 2 schematically shows a perspective view of an apparatus 200 having an RFID tag according to the disclosure. The apparatus 200 is arranged around a fuel tank filler neck.

FIG. 2 schematically shows a perspective view of an apparatus 200 having an RFID tag according to the disclosure. The RFID tag is encapsulated in a structural element 4 and for this reason is not evident in FIG. 2. The structural element 4 may be made from at least one of the following materials, for example: plastic, rubber, cast or epoxy resin, glass, Plexiglas. The material of the structural element 4 may in particular be nonconductive and/or flame retardant. Further, the material could withstand a short circuit that possibly occurs. The material allows the RFID tag to be protected against external influences, such as for example water or fuel. Further, the material and the absence of a current source in the passive RFID tag allow ignition of fuel or fuel vapors to be avoided. In the example of FIG. 2, the structural element 4 may be in annular form, in particular, and may be arranged around a fuel tank filler neck 6. The fuel tank filler neck 6 is used for supplying fuel to the tank of a vehicle. In the case of a passenger vehicle, the fuel tank filler neck 6 for the fuel may be arranged behind a fuel tank cover, in particular. In one example, the RFID tag can be prevented from being read when the fuel tank cover is closed using appropriate grounding. To this end, the grounds of the RFID tag and the bodywork of the vehicle can be connected. The fuel can be put into the tank using a pump nozzle that is arranged in the fuel tank filler neck 6.

In one example, the annular structural element 4 can have a substantially constant internal diameter that can substantially correspond to the external diameter of the fuel tank filler neck 6. In this case, the structural element 4 can preferably be used for fuel tank filler necks 6 having a particular external diameter. The material of the structural element 4 can be elastic to a certain degree in this case so that the structural element 4 can be arranged around the fuel tank filler neck 6 in suitable fashion. In a further example, the annular structural element 4 can have an adjustable internal diameter. In this case, the structural element 4 may be embodied in the form of a clamp, similar to a pipe clamp, for example. The internal diameter of the clamp may be adjustable using an additional screw or screw apparatus, for example. When the internal diameter is adjustable, the structural element 4 can be used for fuel tank filler necks 6 having different external diameters.

Figure 3:
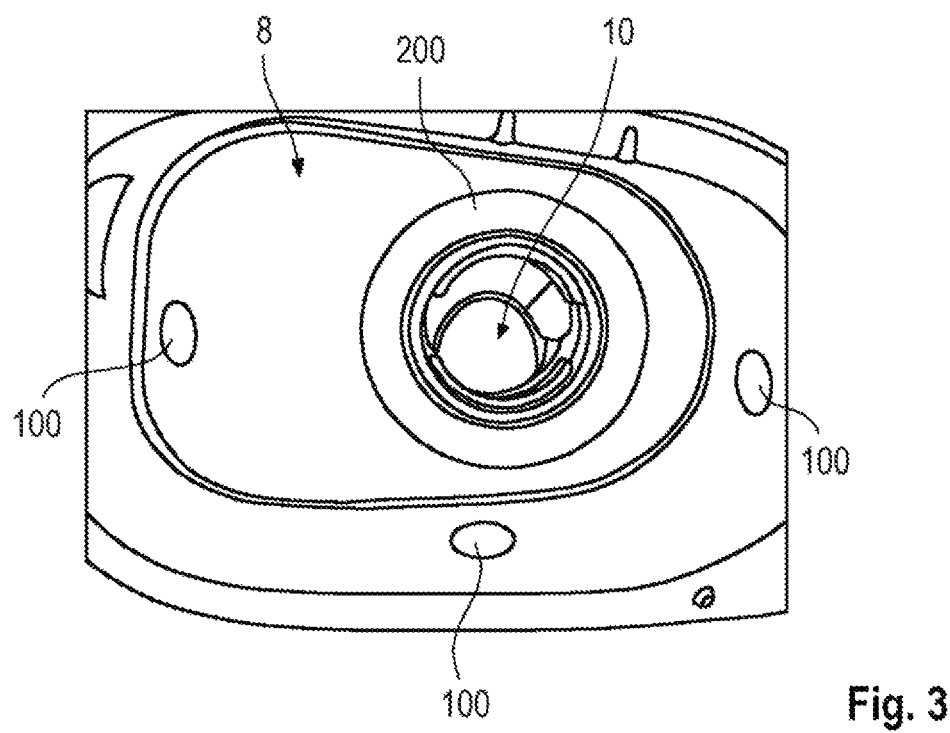
FIG. 3 schematically shows a fuel tank compartment of a vehicle with possible positions for the arrangement of apparatuses 100, 200 having an RFID tag according to the disclosure.

FIG. 3 schematically shows a fuel tank compartment 8 of a vehicle with possible positions for the arrangement of an apparatus having an RFID tag 100, 200 according to the disclosure. The fuel tank compartment 8 may be located behind the fuel tank cover of a vehicle. The fuel tank compartment 8 can have a fuel tank opening 10 of the vehicle arranged in it, into which a pump nozzle for dispensing fuel can be introduced. The fuel tank compartment 8 can have one or more RFID tags 100, 200 having the information about compatible fuel arranged at or in it. In one example, one or more RFID tags 100 according to FIG. 1 may be mounted on an inner wall of the fuel tank compartment 8. In a further example, an RFID tag 200 according to FIG. 2 may be arranged around a fuel tank filler neck of the vehicle.

The RFID tag 100, 200 may be arranged at the fuel tank opening 10 of the vehicle in particular such that a distance between the RFID tag 100, 200 and the fuel tank opening 10 is shorter than a range of an RFID or NFC communication between the RFID tag 100, 200 and an RFID reader. In one example, such a distance may be shorter than approximately 10 cm. In this manner, the information stored in the RFID tag 100, 200 can be read by an RFID reader integrated in a pump nozzle when the pump nozzle is arranged in the fuel tank opening 10. The distance should in this case be shorter than the range of the RFID or NFC communication in any position and at any angle of rotation of the pump nozzle that is in the fuel tank opening 10.

Figure 4:
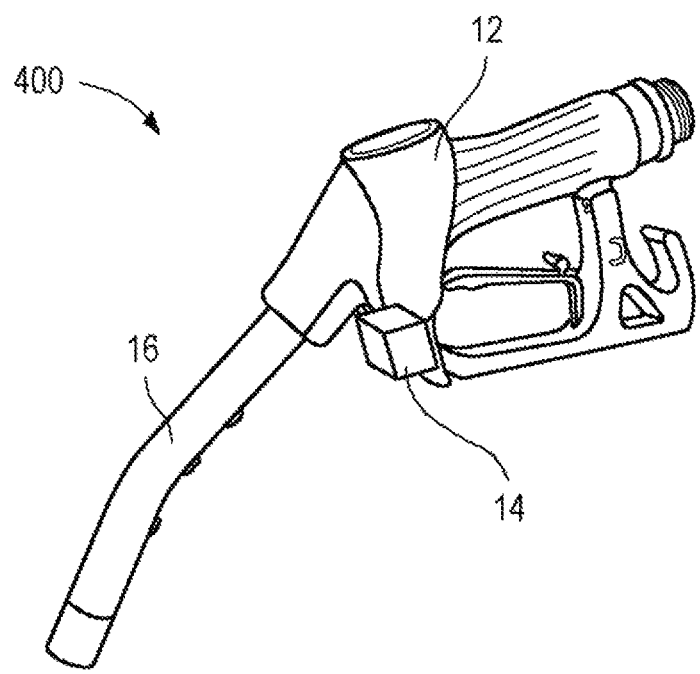
FIG. 4 schematically shows an apparatus 400 according to the disclosure, comprising a pump nozzle having an RFID reader.

FIG. 4 schematically shows an apparatus 400 according to the disclosure, which has a pump nozzle 12 having a filler snout 16 for dispensing a fuel. The pump nozzle 12 may be connected to a gas pump of a gas station via a hose. Further, the apparatus 400 can comprise an RFID reader 14 integrated in the pump nozzle 12. The RFID reader 14 can have a wirelessly rechargeable energy store, such as for example a storage battery. The pump nozzle 12 may be designed to use the RFID reader 14 to read information provided by an RFID tag. The RFID tag may in this case be similar to one of the RFID tags 100, 200 described in FIGS. 1 to 3.

In the example of FIG. 4, the RFID reader 14 may be an active RFID reader. This means that the RFID reader 14 can send query signals and can receive responses from one or more RFID tags. For this purpose, the active RFID reader 14 can have a radio transceiver that can send a radio signal to an RFID tag and can read the response thereof or the information provided by the RFID tag. The RFID reader 14 can send a (possibly coded) radio signal in order to query an RFID tag. The RFID tag can receive the enquiry of the RFID reader and respond by sending response data. That is to say that the RFID tag may be designed to provide the information to the RFID reader in a contactless, in particular encrypted, manner, in particular via a contactless NFC connection. The response data can contain the aforementioned information about a fuel compatible with a vehicle.

In the depiction of FIG. 4, the RFID reader 14 is, merely in example fashion, mounted on the pump nozzle 12 and depicted as a separate component. Independently of the chosen depiction, the RFID reader can be integrated in the pump nozzle 12 or in a component of the pump nozzle 12 and does not necessarily have to be visible from the outside. In one example, the pump nozzle 12 can have a structural element, and the RFID reader 14 may be encapsulated in the structural element. The structural element may be made from at least one of the following materials, for example: plastic, rubber, cast or epoxy resin, glass, Plexiglas. The material allows the RFID reader 14 to be protected against external influences, such as for example water or fuel. Sparking caused by a defective energy store of the RFID reader 14 can lead to ignition of fuel or fuel vapors. In the case of an RFID reader 14 encapsulated in the structural element, such ignition can be avoided.

The apparatus 400 can further have a valve, integrated in the pump nozzle 12, that is designed to either prevent or allow fuel to be dispensed by the pump nozzle 12. The valve can be an electromechanical valve or solenoid valve, in particular. If the RFID reader 14 reads information from an RFID tag of a vehicle that does not identify a fuel compatible with the vehicle, the valve can close, as a result of which it is possible for fuel that is incompatible for the vehicle to be prevented from being dispensed.

The apparatus 400 can further have a memory integrated in the pump nozzle 12. The memory can be designed to store data read by the RFID reader 14. Further, the apparatus 400 can have a transmitter integrated in the pump nozzle 12. The transmitter can be designed to send data stored in the memory via an interface. The data can be sent to a gas pump connected to the pump nozzle, for example. In one example, the interface can be an air interface. In a further example, the interface can be an electrical conductor, for example a cable made of e.g. copper. In yet a further example, the interface can be an optical fiber or a microwave conductor. Such an interface allows in particular sparking and related risks to be avoided.

Figure 5:
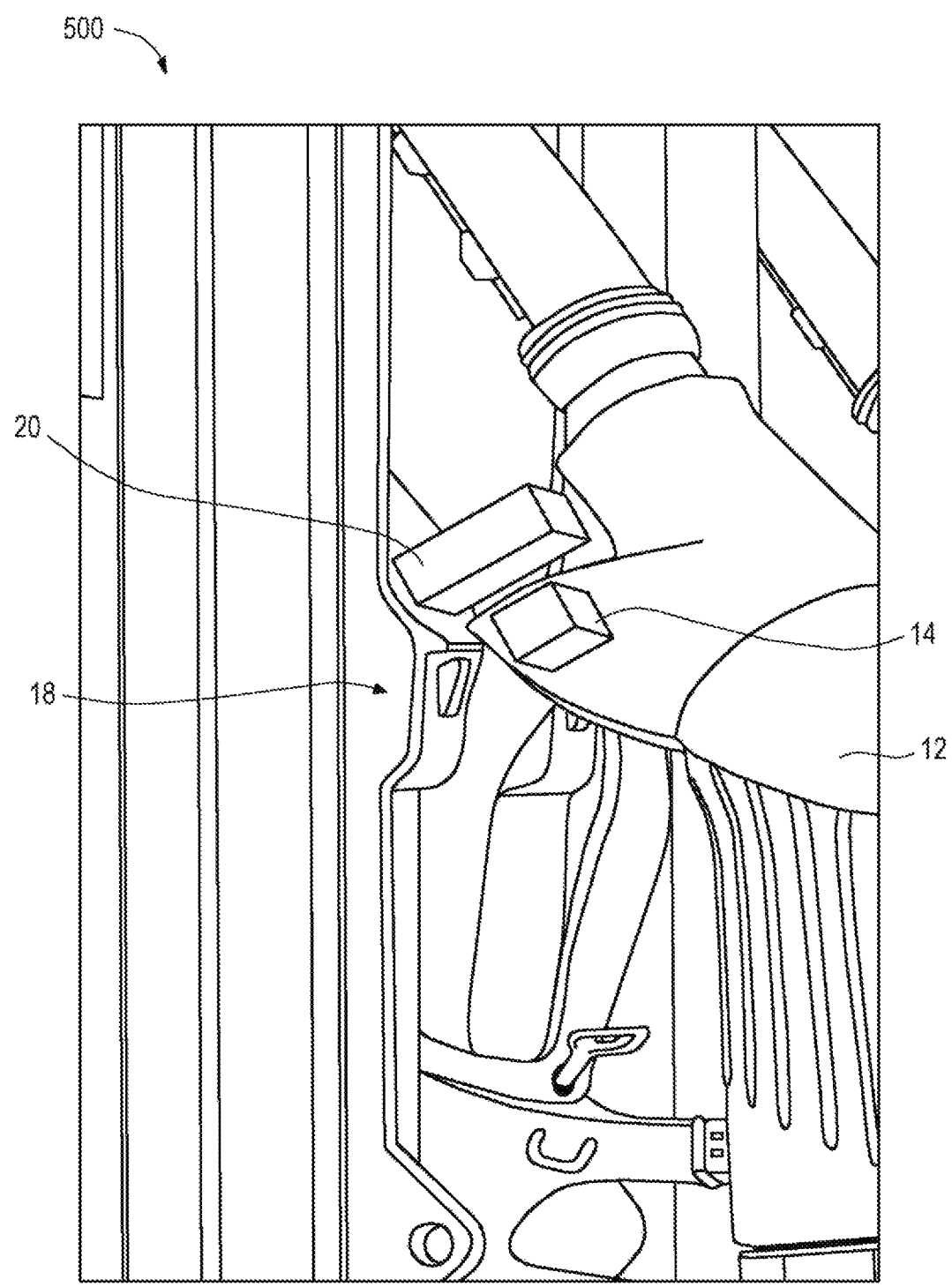
FIG. 5 schematically shows an apparatus 500 according to the disclosure having a pump nozzle according to FIG. 4, which is arranged on a pump nozzle holder.

FIG. 5 schematically shows an apparatus 500 according to the disclosure. The apparatus 500 comprises a pump nozzle 12 having an RFID reader 14, integrated in the pump nozzle 12, having a wirelessly rechargeable energy store, as already described in connection with FIG. 4. The apparatus 500 further comprises a pump nozzle holder 18 on which the pump nozzle 12 may be arranged or hung. The pump nozzle holder 18 may be part of a gas pump of a gas station, for example.

The apparatus 500 can further have a charger 20 arranged on the pump nozzle holder 18. The charger 20 can be designed in particular to wirelessly charge the energy store of the pump nozzle 12 when the pump nozzle 12 is arranged on the pump nozzle holder 18. When the energy store is being wirelessly charged, electrical energy is contactlessly transferred from the charger 20 to the energy store by non-wired electromagnetic fields. By way of example, inductive energy transfer based on inductive coupling can be used in this context. The charging of the energy store can take place in particular in the near field of a few centimeters in this case. A person skilled in the art will understand that this form of charging contributes to the energy efficiency of the disclosed system.

The apparatus 500 can further have a warning unit designed to output a warning signal if it has been determined that a fuel dispensable by the pump nozzle 12 is incompatible with a vehicle. In one example, the warning unit may be integrated in the pump nozzle 12. In a further example, the warning unit may be integrated in the pump nozzle holder 18 or the gas pump.

Figure 6:
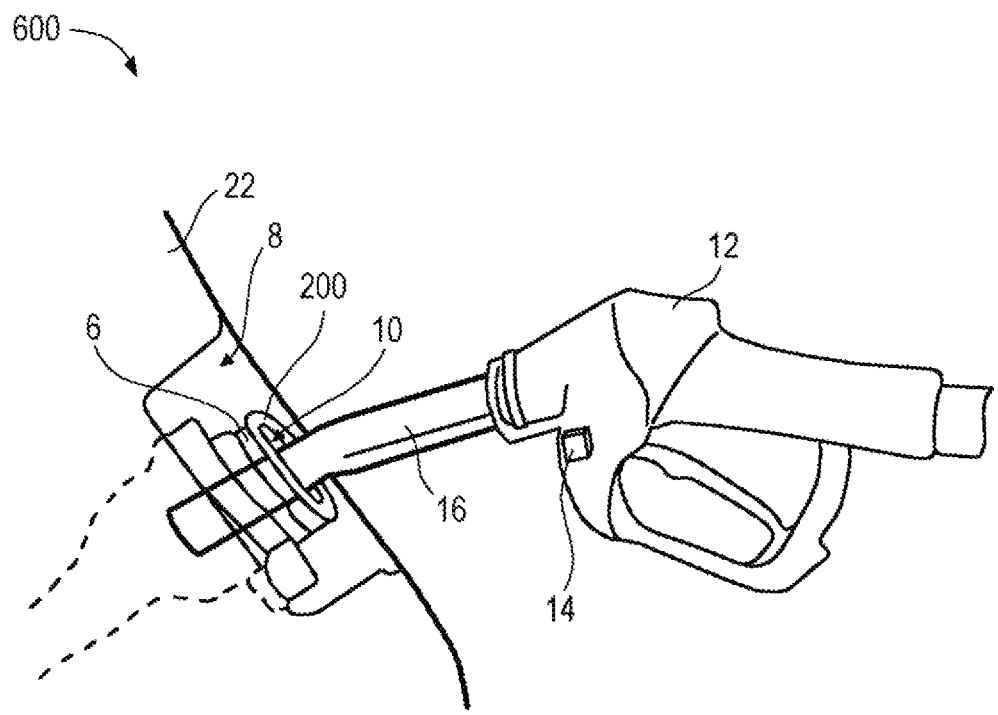
FIG. 6 schematically shows a system 600 according to the disclosure, comprising an RFID tag, arranged at a vehicle fuel tank, and a pump nozzle having an RFID reader.

FIG. 6 schematically shows a system 600 according to the disclosure. The system 600 comprises a passive RFID tag 200 designed to provide information identifying at least one fuel compatible with a vehicle. In the example of FIG. 6, the RFID tag 200 may be similar to the RFID tag of FIG. 2 and may be arranged around a fuel tank filler neck 6 of the vehicle 22. In a further example, the RFID tag 200 can correspond to one or more of the RFID tags 100 of FIG. 3 and may be mounted on an inner wall of a fuel tank compartment 8 of the vehicle 22. The system 600 further comprises a pump nozzle 12 for dispensing a fuel and an RFID reader 14 integrated in the pump nozzle 12, having a wirelessly rechargeable energy store. The pump nozzle 12 may be similar to one of the pump nozzles of FIGS. 4 and 5, for example. In FIG. 6, the filler snout 16 of the pump nozzle 12 is arranged in a fuel tank opening 10 for the purpose of filling the vehicle 22. A method for establishing whether the pump nozzle 12 can dispense a fuel that is compatible with the vehicle 22 is described in connection with FIG. 7.

Figure 7:
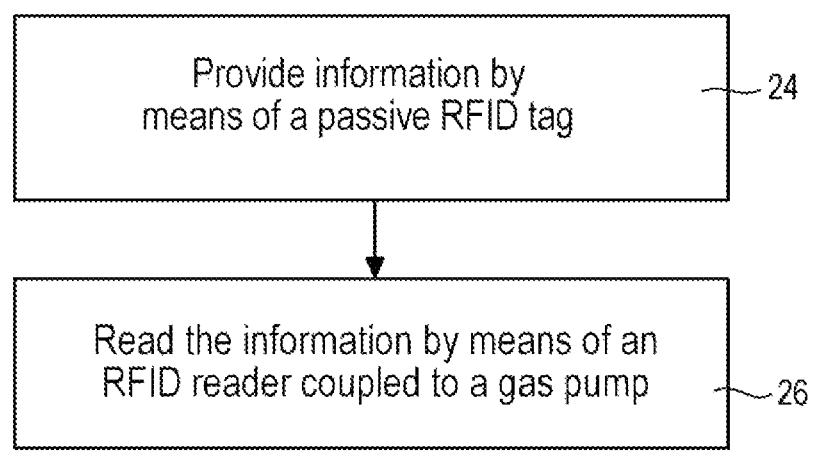
FIG. 7 shows a flow chart for a method according to the disclosure.

FIG. 7 shows a flow chart for a method according to the disclosure. The method is described below in example fashion in connection with the apparatuses of FIGS. 5 and 6. In a step 24, information can be provided by a passive RFID tag 200, wherein the information identifies at least one fuel compatible with a vehicle 22. For a filling process, the pump nozzle 12 is removed from the pump nozzle holder 18 and arranged in the fuel tank opening 10 of the vehicle 22, wherein a distance between the passive RFID tag 200 and the RFID reader 14 integrated in the pump nozzle 12 is shorter than a range of an RFID or NFC communication. The rechargeable energy store integrated in the pump nozzle 12 may have been charged beforehand by the charger 20 arranged on the pump nozzle holder 18.

In a step 26, the information can be read by the RFID reader 14 coupled to a gas pump or the pump nozzle 12. The reading in this case can be performed as soon as the distance between the RFID reader 14 and the RFID tag 200 permits an RFID or NFC communication. In particular, the passive RFID tag 200 may be arranged less than 10 cm away from the RFID reader 14 when the pump nozzle 12 is arranged in the fuel tank opening 10 of the vehicle 22 and the information is read.

The method of FIG. 7 can comprise further optional steps that are described below.

In one example, the information read can be taken as a basis for checking whether a fuel compatible with the vehicle 22 can be provided by the pump nozzle 12. To this end, a simple comparison of the fuel compatible with the vehicle 22 and the fuel provided by the pump nozzle 12 can be performed. In one case, a fuel compatible with the vehicle 22 can be provided by the pump nozzle 12. In this case, a valve integrated in the pump nozzle 12 can be opened or the fuel pump of the gas pump can be activated, so that a compatible fuel can be dispensed by the pump nozzle 12. After the filling process, the pump nozzle 12 can be arranged on the pump nozzle holder 18 again, wherein the energy store of the pump nozzle 12 can be charged by the charger 20.

In a further case, a fuel compatible with the vehicle 22 cannot be provided by the pump nozzle 12. By way of example, the vehicle 22 may have a diesel engine, whereas the pump nozzle 12 provides a gasoline fuel. In this case, the pump nozzle 12 or the gas pump connected thereto can output a warning signal in order to inform the driver of the vehicle 22. Further, incompatible fuel can be prevented from being dispensed by the pump nozzle 12. In one example, the valve arranged in the pump nozzle 12 can be closed for this purpose, so that no fuel can be dispensed by the pump nozzle 12. The closing of the valve can be triggered by the output of a control signal. In a further example, a fuel pump of the gas pump connected to the pump nozzle 12 can be deactivated to prevent an incompatible fuel from being dispensed.

In one example, the information read from the RFID tag 200 by the RFID reader 14 can be stored in a memory integrated in the pump nozzle 12. The stored information can be sent via an interface by a transmitter integrated in the pump nozzle 12. In one example, the interface can be an air interface. In a further example, the interface can be an electrical conductor, for example a cable made of e.g. copper. In yet a further example, the interface can be an optical fiber, in particular a fiber optic cable. By way of example, information can be sent to the gas pump or a central database of the gas station and processed there. The sent data can comprise in particular information identifying the vehicle 22 that is read from the passive RFID tag 200.

In one example, the RFID tag 200 can provide information explicitly determining the identity of the vehicle 22 to be filled. The information can comprise the vehicle identification number of the vehicle 22, for example. Prior to a filling process, the RFID reader 14 of the pump nozzle 12 can read this information, the information can be stored in a memory, and it can be sent via an interface by a transmitter. By way of example, the information can be sent to a database that is used to store the times of the filling processes performed at the gas pump, the amounts of fuel obtained and the associated identities of the vehicles filled. This allows theft of fuel to be prevented or an affected vehicle to be explicitly identified.

In one example, the information explicitly determining the identity of the vehicle to be filled can be used to identify a stolen vehicle. A stolen vehicle can easily be tracked as a result. The identity information can be compared against a black list of vehicles reported stolen, for example. The list may be stored in a database that is available locally at the pump nozzle 12 or at the gas pump. In a further example, the list can be provided via an Internet connection. In a further step, fuel can be prevented from being dispensed by the pump nozzle 12 if a vehicle is identified as stolen.

In one example, the vehicle and/or the driver of the vehicle may be explicitly linked to an (Internet) account. The (Internet) account can store information used for a payment process, such as for example credit card data. A connection can be set up between the pump nozzle 12 or the gas pump and the Internet. After explicit identification of the vehicle 22 using for example the vehicle identification number, a connection can be set up between the gas pump and the (Internet) account and, based on the credit card information obtained thereby, a payment process can be performed for fuel that has been obtained. An automatic payment service of this kind allows a gas station to provide a "Fuel and Go" function. The resultant time and cost saving would be of interest to transport companies, in particular. The described payment method can be based on a two factor authorization, for example. For a two factor authorization, the first factor can be provided by the vehicle, while the second factor is provided by an additional device, for example a cell phone. A person skilled in the art is familiar with the method of two factor authorization, which means that a detailed description can be dispensed with at this juncture.

In one example, there can be a communication between the pump nozzle 12 or the gas pump and the ignition of the vehicle 22 to be filled. The gas pump can trigger a lock request for the ignition of the vehicle 22, in particular after it has begun to pump fuel into the vehicle 22. While such a lock request is active, the ignition of the vehicle 22 can no longer be operated and the vehicle 22 can no longer be started. By way of example, after the fuel has been paid for and/or when the fuel tank of the vehicle 22 has been duly locked again after the filling process, the lock on the ignition can be deactivated again. The steps described allow fuel theft to be prevented. Further, onward travel by the vehicle 22 under safe conditions can be ensured. Besides this, there can be theft prevention during the filling process, since the engine of the vehicle 22 cannot be started before the pump nozzle 12 has been removed from the fuel tank opening 10 of the vehicle 22.

In one example, a communication can take place between the vehicle 22, in particular a vehicle network, and the gas pump. The vehicle network can transmit various information about the state of the vehicle 22 to the gas pump. Applicable state variables can include for example tire pressure, oil level, etc. Analysis of the state variables allows the gas pump to provide a warning or advice of services offered. If the result of an analysis of the state variables is that the oil level of the vehicle is too low, for example, the gas pump can output a warning and/or advice that suitable engine oil and/or the service of an oil change is available at the gas station.

In one example, a communication between the pump nozzle 12 or the gas pump and a network of the vehicle 22 can take place. The gas pump can transmit to the vehicle network information about what quantity of fuel has been put into the tank of the vehicle 22. The vehicle network can store the transmitted value in an electronic journey log in the form of e.g. a database. The values for amounts of fuel in successive filling processes in combination with measured values for the distances covered by the vehicle 22 can be used by the vehicle network to ascertain a precise fuel consumption of the vehicle 22.

EXAMPLES

RFID apparatuses and associated communication methods are explained below using examples.

Example 1 is an apparatus comprising: a passive RFID tag designed to provide information identifying at least one fuel compatible with a vehicle.

Example 2 is an apparatus according to example 1, wherein the passive RFID tag is designed to be arranged at a fuel tank opening of the vehicle, wherein a distance between the passive RFID tag and the fuel tank opening is shorter than a range of an NFC communication.

Example 3 is an apparatus according to example 1 or 2, wherein the passive RFID tag is encapsulated in a structural element.

Example 4 is an apparatus according to example 3, wherein the structural element is in annular form.

Example 5 is an apparatus according to example 3 or 4, wherein the structural element is designed to be arranged around a fuel tank filler neck of the vehicle.

Example 6 is an apparatus according to one of the preceding examples, wherein the passive RFID tag is designed to be mounted on an inner wall of a fuel tank compartment of the vehicle.

Example 7 is an apparatus according to one of the preceding examples, wherein the information further explicitly determines the identity of the vehicle.

Example 8 is an apparatus comprising: a pump nozzle for dispensing a fuel; and an RFID reader, integrated in the pump nozzle, having a wirelessly rechargeable energy store.

Example 9 is an apparatus according to example 8, further comprising: a pump nozzle holder; and a charger, arranged on the pump nozzle holder, that is designed to wirelessly charge the energy store when the pump nozzle is arranged on the pump nozzle holder.

Example 10 is an apparatus according to example 8 or 9, wherein the pump nozzle comprises a structural element, and the RFID reader is encapsulated in the structural element.

Example 11 is an apparatus according to one of examples 8 to 10, further comprising: a valve, integrated in the pump nozzle, that is designed to either prevent or allow fuel to be dispensed by the pump nozzle.

Example 12 is an apparatus according to one of examples 8 to 11, further comprising: a memory, integrated in the pump nozzle, that is designed to store data read from an RFID tag by the RFID reader.

Example 13 is an apparatus according to example 12, further comprising: a transmitter, integrated in the pump nozzle, that is designed to send data stored in the memory via an interface.

Example 14 is an apparatus according to one of examples 8 to 13, further comprising: a warning unit designed to output a warning signal when it has been determined that a fuel dispensable by the pump nozzle is incompatible with the vehicle.

Example 15 is a system comprising: a passive RFID tag designed to provide information identifying at least one fuel compatible with a vehicle; a pump nozzle for dispensing a fuel; and an RFID reader, integrated in the pump nozzle, having a wirelessly rechargeable energy store.

Example 16 is a system according to example 15, wherein the passive RFID tag is arranged less than 10 cm away from the RFID reader when the pump nozzle is arranged in a fuel tank opening of the vehicle.

Example 17 is a method comprising: providing information using a passive RFID tag, wherein the information identifies at least one fuel compatible with a vehicle; and reading the information using an RFID reader coupled to a gas pump.

Example 18 is a method according to example 17, further comprising: checking whether a fuel compatible with the vehicle can be provided by a pump nozzle, based on the information read; and, if a fuel compatible with the vehicle cannot be provided by the pump nozzle, at least one from: outputting a warning signal, and preventing fuel from being dispensed by the pump nozzle.

Example 19 is a method according to example 18, wherein the preventing of fuel being dispensed comprises closing a valve in the pump nozzle.

Example 20 is a method according to one of examples 17 to 19, further comprising: storing the read information in a memory integrated in a pump nozzle; and sending the stored information via an interface using a transmitter coupled to the gas pump when the pump nozzle is arranged on a pump nozzle holder.

Example 21 is a method according to example 20, wherein the sent data comprise information, read from the passive RFID tag, that identifies the vehicle.

Although specific implementations have been depicted and described herein, it is obvious to a person of average skill in the art that a multiplicity of alternative and/or equivalent implementations can replace the specific implementations shown and described without departing from the scope of the present disclosure. This application is intended to cover all adaptations or variations of the specific implementations discussed herein. The intention is therefore for this disclosure to be restricted only by the claims and the equivalents thereof

The invention claimed is:

1. An apparatus comprising:
a passive radio frequency identification (RFID) tag configured to:
provide information identifying at least one type of fuel compatible with a vehicle, and
provide identity information identifying the vehicle, wherein the identity information is used to:
identify the vehicle as being stolen, and
trigger a lock request for an ignition of the vehicle.

2. The apparatus as claimed in claim 1, wherein the passive RFID tag is configured to be arranged at a fuel tank opening of the vehicle, wherein a distance between the passive RFID tag and the fuel tank opening is shorter than a range of a near field communication (NFC) communication.

3. The apparatus as claimed in claim 1, wherein the passive RFID tag is configured to be mounted on an inner wall of a fuel tank compartment of the vehicle.

4. The apparatus as claimed in claim 1, wherein the passive RFID tag is supplied with energy via electromagnetic induction.

5. The apparatus as claimed in claim 1, wherein the identity information is further used to at least one of:
track times associated with a fuel filling process,
track the vehicle based on the vehicle being identified as stolen,
link the vehicle with an account for an automatic payment method,
track a quantity of fuel obtained by the vehicle,
prevent theft of fuel, or
prevent fuel from being dispensed to the vehicle based on the vehicle being identified as stolen.

6. The apparatus as claimed in claim 1, wherein the passive RFID tag is encapsulated in a structural element.

7. The apparatus as claimed in claim 6, wherein the structural element is in annular form, or
wherein the structural element is configured to be arranged around a fuel tank filler neck of the vehicle.

8. An apparatus comprising:
a pump nozzle for dispensing a fuel; and
a radio frequency identification (RFID) reader, integrated in the pump nozzle, having a wirelessly rechargeable energy store, and configured to:
receive identity information identifying a vehicle, wherein the identity information is used to:
identify the vehicle as being stolen, and
trigger a lock request for an ignition of the vehicle.

9. The apparatus as claimed in claim 8, further comprising:
a pump nozzle holder; and
a charger, arranged on the pump nozzle holder, configured to wirelessly charge the energy store when the pump nozzle is arranged on the pump nozzle holder.

10. The apparatus as claimed in claim 8, wherein the pump nozzle comprises a structural element, and the RFID reader is encapsulated in the structural element.

11. The apparatus as claimed in claim 8, further comprising:
a valve, integrated in the pump nozzle, configured to either prevent or allow the fuel to be dispensed by the pump nozzle.

12. The apparatus as claimed in claim 8, further comprising:
a warning unit configured to output a warning signal when it has been determined that the fuel dispensable by the pump nozzle is incompatible with the vehicle for which the pump nozzle is to be used to dispense the fuel.

13. The apparatus as claimed in claim 8, further comprising:
a memory, integrated in the pump nozzle, configured to store data read from an RFID tag by the RFID reader.

14. The apparatus as claimed in claim 13, further comprising:
a transmitter, integrated in the pump nozzle, configured to send data stored in the memory via an interface.

15. A system comprising:
a passive radio frequency identification (RFID) tag configured to:
provide information identifying at least one type of fuel compatible with a vehicle, and
provide identity information identifying the vehicle,
wherein the identity information is used to:
identify the vehicle as being stolen, and
trigger a lock request for an ignition of the vehicle;
a pump nozzle for dispensing fuel; and
an RFID reader, integrated in the pump nozzle, having a wirelessly rechargeable energy store, and configured to receive the identity information.

16. The system as claimed in claim 15, wherein the passive RFID tag is arranged less than 10 cm away from the RFID reader when the pump nozzle is arranged in a fuel tank opening of the vehicle.

17. A method comprising:
providing information using a passive radio frequency identification (RFID) tag,
wherein the information identifies at least one type of fuel compatible with a vehicle and includes identity information identifying the vehicle,
wherein the identity information is used to:
identify the vehicle as being stolen, and
trigger a lock request for an ignition of the vehicle; and
reading the information using an RFID reader coupled to a gas pump.

18. The method as claimed in claim 17, further comprising:
checking whether a fuel compatible with the vehicle can be provided by a pump nozzle based on the information; and
if a fuel compatible with the vehicle cannot be provided by the pump nozzle, at least one of:
outputting a warning signal, or
preventing fuel from being dispensed by the pump nozzle.

19. The method as claimed in claim 18, wherein preventing fuel from being dispensed comprises:
closing a valve in the pump nozzle.

20. The method as claimed in claim 17, further comprising:
storing the information in a memory integrated in a pump nozzle; and
sending the information via an interface using a transmitter coupled to the gas pump when the pump nozzle is arranged on a pump nozzle holder.

21. The method as claimed in claim 20, wherein the information, sent using the transmitter, is used as a factor in a two factor authorization process.

* * * * *